United States Patent [19]
Brumlik

[11] 3,932,090
[45] Jan. 13, 1976

[54] ADJUSTABLE EXTRUSION APPARATUS FOR PRODUCING THREAD-LIKE PRODUCTS

[75] Inventor: George C. Brumlik, Montclair, N.J.
[73] Assignee: Ingrip Fasteners, Inc., New York, N.Y.
[22] Filed: Jan. 31, 1973
[21] Appl. No.: 328,203

[52] U.S. Cl. ............... 425/381; 425/465; 425/466
[51] Int. Cl.² ...................... B29F 3/04; B29D 1/00
[58] Field of Search ..... 264/176 R, 177 R; 425/376, 425/380, 381, 461, 465, 466, 113, 382; 408/210, 212, 213

[56] References Cited
UNITED STATES PATENTS

| | | | |
|---|---|---|---|
| 2,578,229 | 12/1951 | Clement et al. | 425/466 X |
| 3,280,847 | 10/1966 | Chisholm et al. | 425/466 X |
| 3,358,329 | 12/1967 | Martin et al. | 425/465 X |
| 3,422,648 | 1/1969 | Lemelson | 425/466 X |
| 3,461,499 | 8/1969 | Nevin et al. | 425/113 |

*Primary Examiner*—Francis S. Husar
*Assistant Examiner*—Mark Rosenbaum
*Attorney, Agent, or Firm*—Burgess, Dinklage & Sprung

[57] ABSTRACT

Extruded articles having integral ribs and/or integral rows of spaced apart elements extending transverse to the direction of extrusion are formed by forcing a melt flowable material such as a thermoplastic polymer through an extrusion opening. The material is continuously extruded in a first lateral or annular extrusion zone in the extrusion opening while the material being extruded in a second lateral or annular extrusion zone, which is contiguous with the first zone, is periodically interrupted, modulated and/or restricted.

3 Claims, 38 Drawing Figures

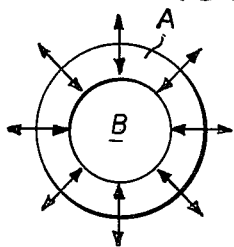
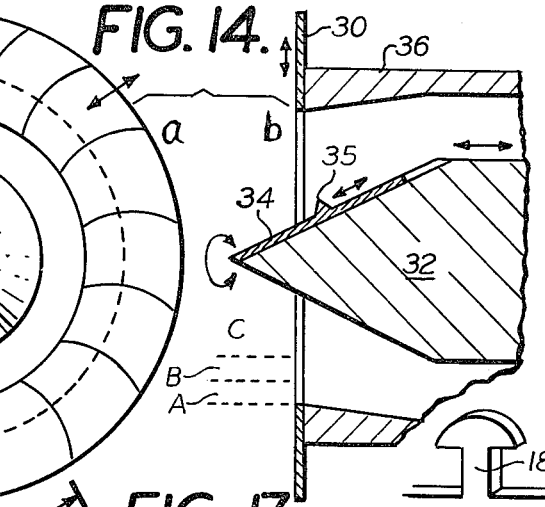
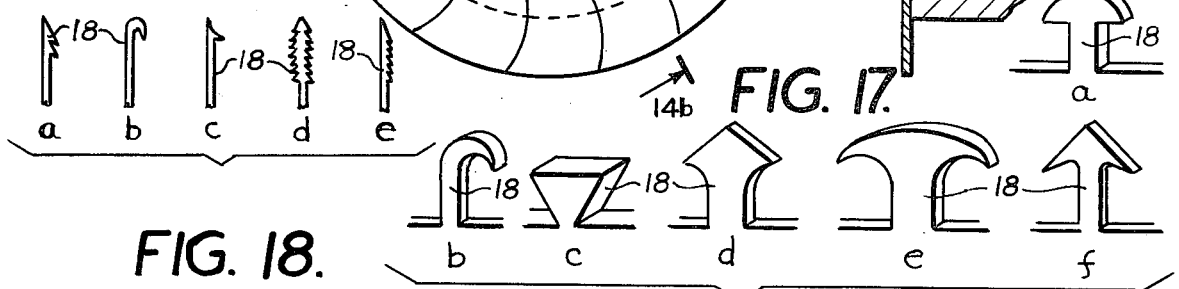
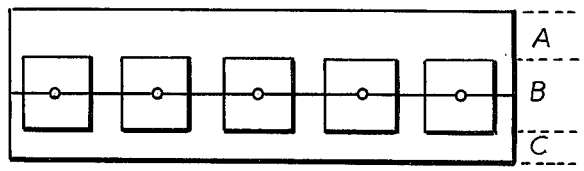
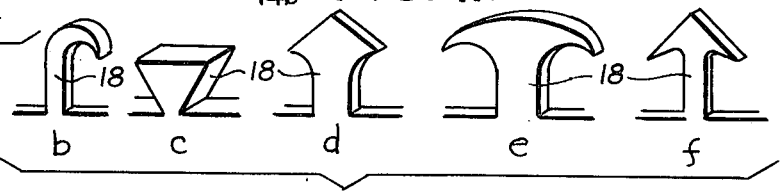
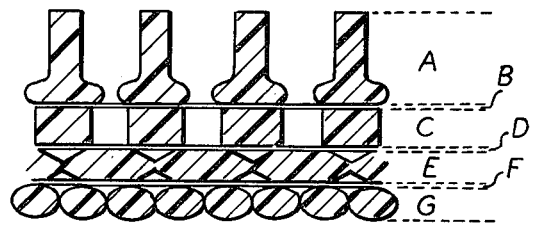
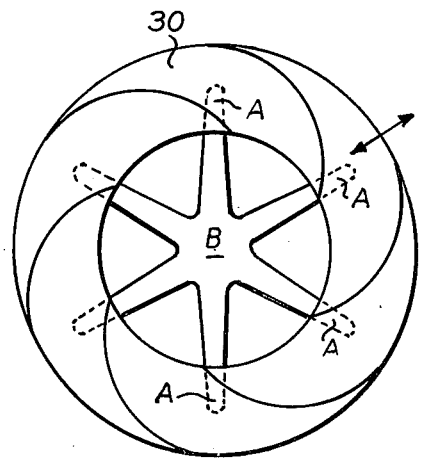
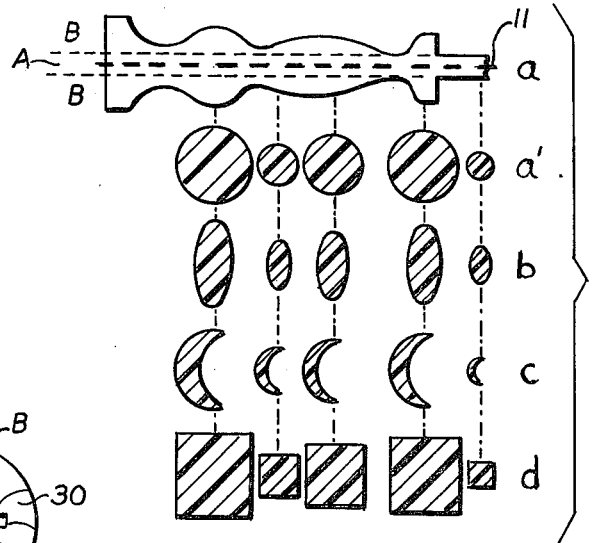
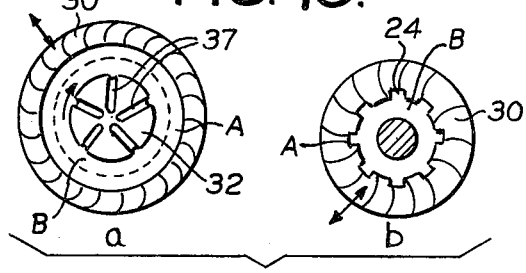

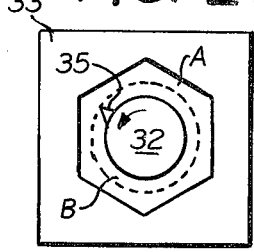
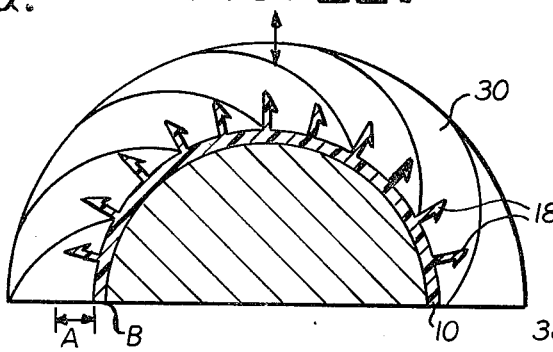
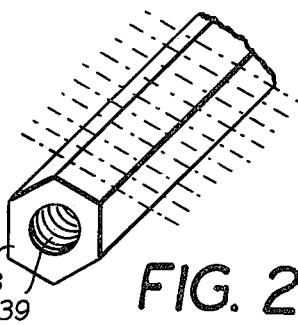
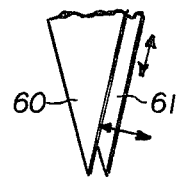
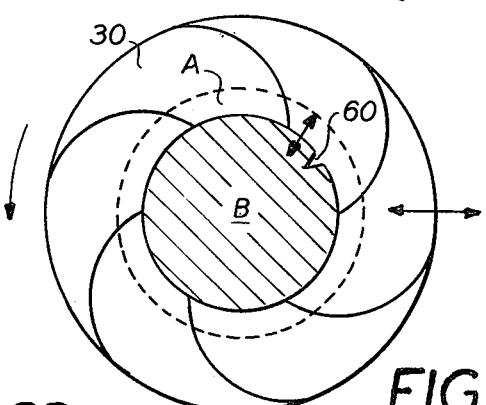
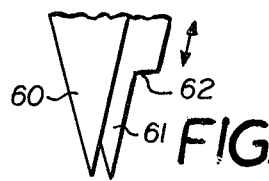
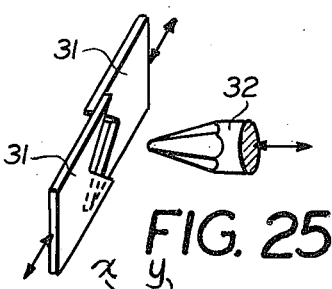
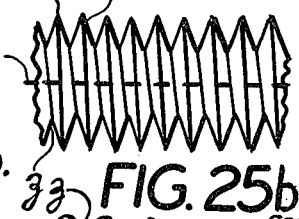
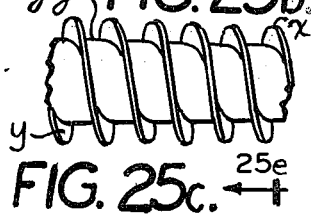
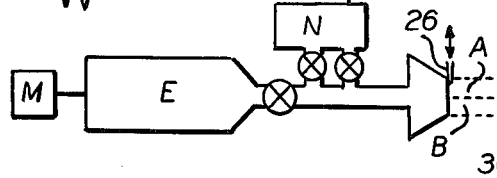
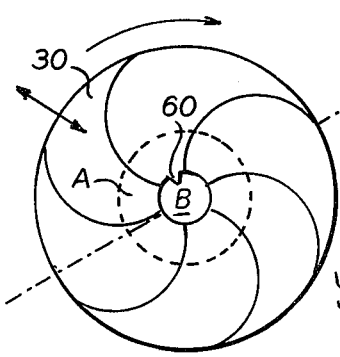
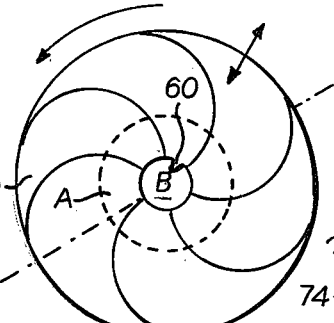
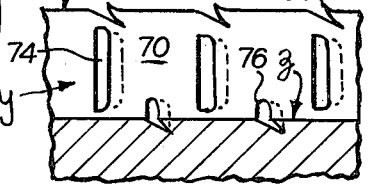
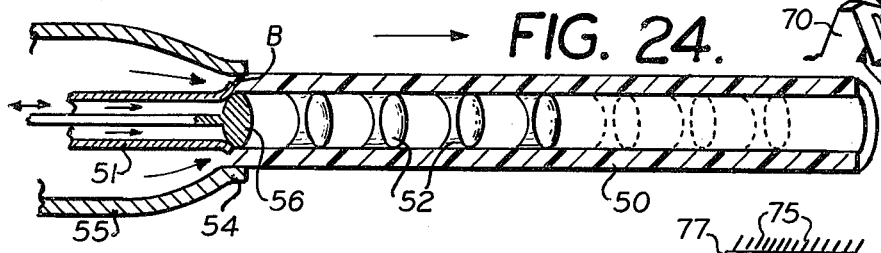
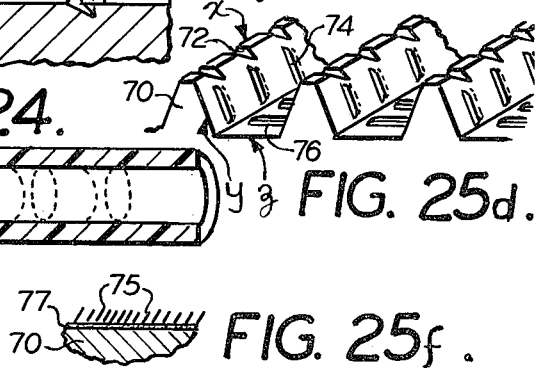

ADJUSTABLE EXTRUSION APPARATUS FOR PRODUCING THREAD-LIKE PRODUCTS

BACKGROUND

This invention relates to the process and apparatus for forming extruded articles having integral ribs and/or integral rows of spaced apart elements such as gripping elements extending transverse of the direction of extrusion.

SUMMARY

The present invention provides extruded articles capable of having intricate, varied and three-dimensional structures which can be rapidly and efficiently mass produced from readily available raw materials.

The extruded articles of the invention have integral ribs and/or integral rows of spaced apart elements such as gripping elements which extend transverse to the direction of extrusion and are formed by forcing a flowable material such as a thermoplastic polymer through an extrusion opening, continuously extruding the material in a first lateral or annular extrusion zone in the extrusion opening while periodically interrupting, modulating, and/or restricting the material being extruded in a second lateral or annular extrusion zone in the extrusion opening, the second zone being contiguous with the first.

DESCRIPTION OF THE DRAWINGS

FIG. 9 is a perspective view of an extruded article according to the invention formed in an extrusion opening similar to FIG. 8a;

FIG. 13 is a diagrammatic view of an annular extrusion opening for forming articles according to the invention;

FIGS. 14a is a diagrammatic view and FIG. 14b is a sectional view of an annular extrusion opening having a plurality of extrusion zones according to the invention;

FIGS. 15a and b are plan views of suitable means of interrupting material extruded in a zone in an annular extrusion opening according to the invention;

FIG. 16a through 16e are side elevational views of examples of gripping elements that can be formed in integral rows by the extrusion technique of the invention;

FIG. 17a through 17f are perspective views of additional gripping elements that can be formed in spaced apart rows according to the invention;

FIG. 18 is a diagrammatic view of an extrusion opening of the invention having a plurality of extrusion zones for forming a multi-layer article having a intermediate honeycomblike layer;

FIG. 19 is a cross sectional view of a complex multi-layer extruded article formed according to the invention;

FIG. 20 is a front view of a star-shaped extrusion opening with iris means for interrupting or restricting the material extruded in an annular zone in the star-shaped opening;

FIG. 21a is a side elevational view and FIGS. 21a' through 21d are cross sectional views of several extruded articles formed according to the invention by restricting the flow of material in the second extrusion zone;

FIG. 22 is a front view of an extrusion opening having a zone defining a row of spaced apart gripping elements and iris means for interrupting material extruded in this zone;

FIGS. 23a is a front view of an annular extrusion opening including iris means and thread forming means;

FIG. 23b is an exploded diagrammatic view of an annular extrusion opening having dual iris means and left and right hand thread forming means.

FIGS. 23c and 23d are perspective views partly broken away on a greatly enlarged scale illustrating further embodiments of the thread forming means utilized in the present invention.

FIG. 24 is a diagrammatic view in side elevation illustrating suitable apparatus for extruding a hollow article such as a tube having integral, simultaneously extruded uniformly or randomly spaced apart dividing elements.

FIGS. 25a and b are perspective views of screwtype devices that can be formed according to the present invention with biased means thereon in various combinations such that little resistance is offered to the advancing motion of the screw device but unscrewing is strongly resisted.

FIGS. 25c and d are perspective views and FIG. 25f is a sectional view illustrating various ways in which screw device of the invention can be provided with biased means.

FIG. 25e is a sectional view taken along line 25e of FIG. 25c.

FIG. 26 is a perspective view of means according to the invention for peripherally varying an extrusion opening via sliding plate means and for interiorly varying an extrusion zone via a movable needle type valve member.

FIG. 27a is a front view of apparatus according to the invention for extruding an interiorly threaded article. FIG. 27b is a perspective view of an article produced using the apparatus of FIG. 27a which can be cut along the dotted lines to form individual interiorly threaded nuts.

FIG. 28 is a diagrammatic side view of extrusion apparatus suitable for use in the invention with means for compensating for changes in back pressure due to interruptions, modulation and/or restriction of extrusion zone A.

DESCRIPTION

Figure 1:
FIG. 1 is a diagrammatic view of an extrusion opening divided into extrusion zones according to the invention.

Referring now to the drawing and in particular FIG. 1 an extrusion opening for forming articles having integral ribs (FIG. 2–5) or integral rows of spaced apart elements (FIG. 9) such as integral rows of spaced apart gripping elements (FIG. 10), all of which extend transverse to the direction of extrusion, is shown to include a first lateral zone A in the extrusion opening and a second lateral zone B in the extrusion opening which is contiguous with the first zone A. One of the zones A or B is designed to permit the substantially continuous extrusion of melt flowable material therein and the other of the zones A or B is adapted to periodically interrupt and/or restrict the material being extruded therein. Also, the function of zones A and B can be alternated in sequence during the same extrusion operation.

Figure 2:
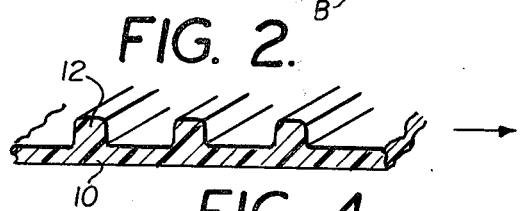
FIGS. 2 through 6 are perspective views in cross section and partly broken away of extruded articles according to the present invention.
Figure 3:
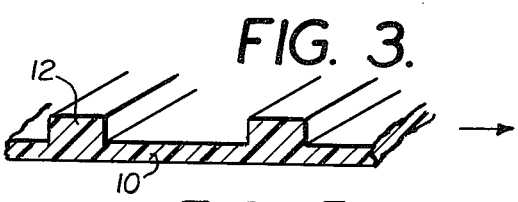
Figure 4:
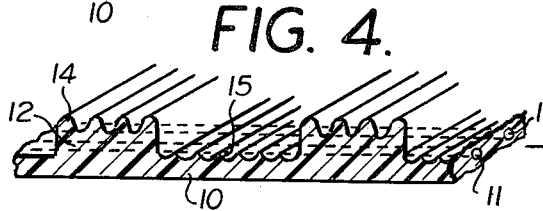

For example, in FIGS. 2, 3, and 4 the material being extruded through the extrusion opening shown in FIG. 1 can be considered to be continuously extruded in zone B while the material being extruded in Zone A is periodically interrupted to form the transverse ribs 12 integral with base 10 as shown in FIGS. 2 and 3. In FIG. 4, the material extruded in zone A is interrupted periodically to form ribs 12 integral with base 10 (from zone B) and is also restricted to form the secondary ribs 14 on the primary ribs 12 as well as the wavy pattern comprising crests 15 with troughs between the base 10 and between the ribs 12.

It should be noted that the structures shown in FIGS. 2, 3, and 4 can all be readily extruded using the same apparatus having an extrusion opening as diagramatically shown in FIG. 1. Thus, there is no need to change dies, etc., and apparatus having an extrusion opening is illustrated in FIG. 1 is capable of extruding an infinite variety of regular, irregular or random shapes or patterns.

Figure 5:
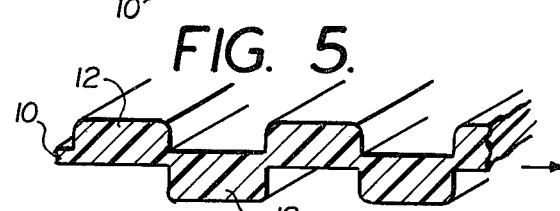

It is also possible to extrude more complex shapes such as that shown in FIG. 5 having alternating transverse ribs 12 on both sides of a base 10. Such a shape can be extruded through an opening as shown in FIG. 1 by alternately and periodically extruding material continuously in one zone and then the other while at the same time interrupting the material being extruded in the contiguous zone.

A structure such as that shown in FIG. 5 can also be extruded in an extrusion opening having three zones wherein material is continuously extruded in zone B to form base 10 and periodically interrupted in zones A and C alternately to form the ribs 12 as shown in FIGS. 5 or at the same time or random times to form extruded structures having transverse ribs on both sides of the base in a predetermined or random pattern.

Figure 6:
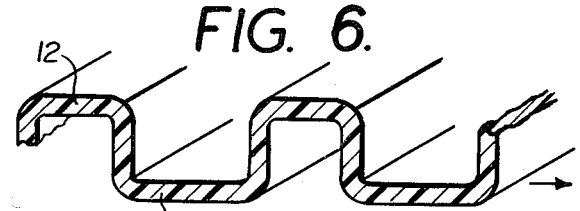
Figure 7:
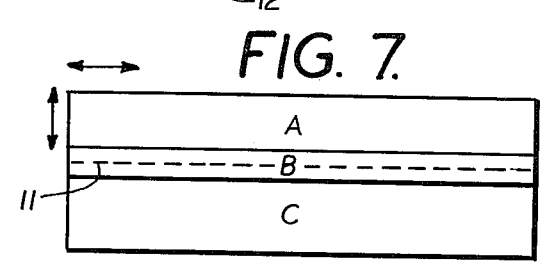
FIG. 7 is a diagrammatic view of an extrusion opening having a plurality of extrusion zones according to the invention.

The material being extruded in a zone can be restricted or interrupted in either direction in the case of the extrusion openings shown in FIGS. 1 and 7 and illustrated by the double headed arrows a and b in FIG. 7. Also in the case of the linear extrusion openings illustrated in FIG. 7, it should be obvious that the material being extruded can be regulated in a wide variety of ways and the character of the extrusion, for example continuous or interrupted, can be changed, interchanged or alternated in any desired manner. Thus, for example, by continuously extruding any one zone while interrupting the material extruded in the continuous zone or zones and causing the continuous extrusion zones to move up and down in the extrusion opening, it is possible to extrude the transversely corrugated structure shown in FIG. 6, for example.

Figure 8A:
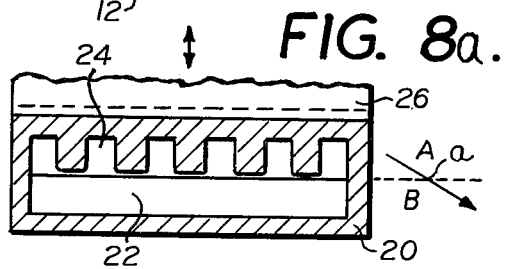
FIGS. 8a and 8b are front views of extrusion openings having zones which in transverse profile define a row of spaced apart elements.
Figure 8B:
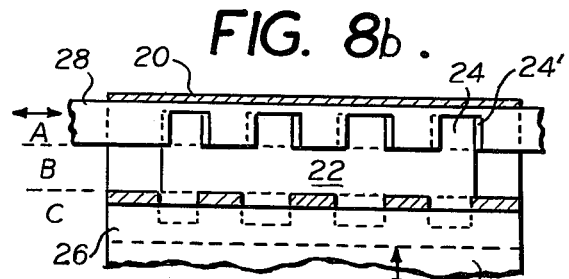
Figure 9:
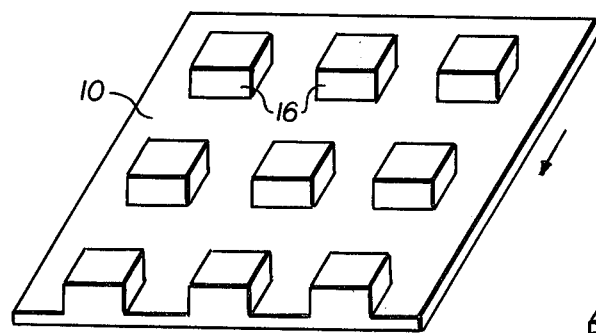
Figure 10:
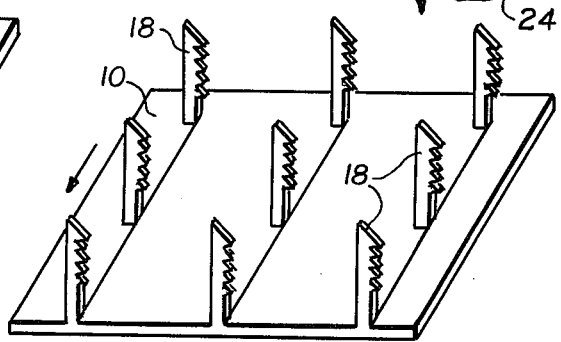
FIG. 10 is a perspective view of an extruded multielement self-gripping device formed according to the invention.

Referring now to FIGS. 8a and 8b, it is also possible for one or more zones in the extrusion opening to define in transverse profile a row of spaced apart elements. This embodiment is adapted to extrude articles such as those shown in FIGS. 9 and 10 having integral rows of spaced apart elements 16 as shown in FIG. 9 or spaced apart integral rows of gripping elements 18 as shown in FIG. 10 all of said rows being transverse to the direction of extrusion as indicated by the arrows shown in FIGS. 9 and 10. In FIG. 8a there is shown an extrusion opening capable of forming an integral extruded article such as that shown in FIG. 9. Zone B identified by reference numeral 22 is adapted for continuous extrusion to form the base 10 of an extruded article while zone A contiguous with zone B in transverse profile defines a row of spaced apart elements 24. A reciprocating gate member 26 is adapted to periodically interrupt the flow of material being extruded in zone A, thus forming rows of spaced apart integral elements illustrated in FIG. 9. FIG. 8b shows a similar arrangement having zones A and C which define a row of spaced apart elements 24 on both sides of and contiguous with central zone B. FIG. 8b also illustrates the use of a sliding or oscillating member 28 having openings 24 which are adapted to slide into register with the profile zone A defining the elements 24. The member 28 can slide back and forth to interrupt the extrusion in zone B or it can be a continuous belt-like member which slides across zone A in one direction. A reciprocating gate member 26 is illustrated for interrupting the extrusion in zone C for FIG. 8b and it should be understood that an oscillating element such as that illustrated by element 28 can also be used in zone C in FIG. 8b or in zone A of FIG. 8a.

From FIGS. 8a and 8b it should be clear that one or more zones may define in transverse profile a random or uniform row of spaced apart elements 24 which may have any desired shape such as the rectangular shape shown in FIG. 9 or the shape of gripping elements 18 as shown in FIG. 10, 16 and 17 wherein the gripping means forming part of the gripping element 18 such as barbs, hooks, etc. are oriented in the direction of the transverse integral row.

Figure 11:
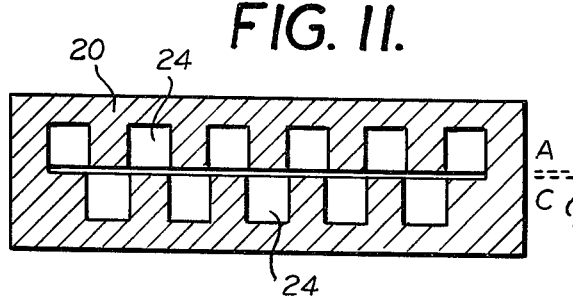
FIG. 11 is a front view of an extrusion opening of the invention for forming a multi-layer integral open grid article.
Figure 12:
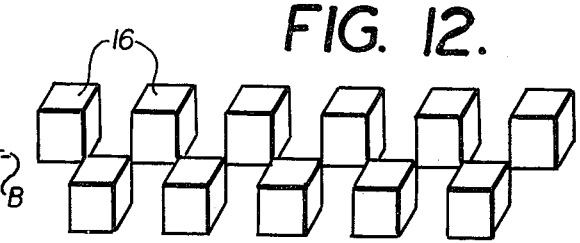
FIG. 12 is a perspective view of an extruded integral open grid article formed using the extrusion opening of FIG. 11.

FIGS. 11 and 12 illustrate an arrangement similar to that of FIG. 8b but the continuous zone B is relatively thin and the spaced apart elements alternate on opposite sides in Zones A and C. Interrupting the flow fron zones A and C using a reciprocating gate 26 or an oscillating member 28 as shown in FIG. 8b results in a structure which is a multi-layer, integrally open grid-type article. FIG. 18 illustrates the opposite arrangement wherein the material is continuously extruded in zones A and C and interrupted in Zone B to form a honeycomb-like multi-layer structure.

FIG. 19 illustrates that complex multi-layer structures can be extruded in a single operation by continuously extruding in zones B, D and F while interrupting the extrusion in zones A, C, E and G each of which defines a row of differently shaped spaced apart elements.

Referring now to FIGS. 13–15 and 20–22, there are shown annular extrusion openings for forming articles having integral ribs such as shown in FIG. 21 or integral rows of spaced apart elements (FIG. 20) such as integral rows of spaced apart gripping elements (FIG. 22) all of which extend transverse to the direction of extrusion. In FIG. 13 material is continuously extruded in annular zone A and is periodically interrupted, modulated, or restricted in annular zone B which is contiguous with surrounding continuous extrusion zone A.

FIGS. 14a and b illustrate three extrusion zones, Zone B a continuous extrusion zone and zones A and C being adapted to be periodically interrupted, modulated or restricted. In zone A means such as iris 30 which is adapted to move in and out of zone A to control and modulate extrusion as indicated by the arrow in Zone A.

Zone C extrusion is modulated and controlled by member 32 which can be cylindrical or can be truncated as a needle valve and which can rotate and/or reciprocate in zone C as shown by the arrows in FIG. 14b. Extrusion barrel 36 defines the outer perifery of zone A and iris 30 is shown mounted on the front thereof in FIG. 14b withdrawn to the outer boundary of Zone A as represented by the dotted line behind iris 30 in FIG. 14a. Member 32 shaped as a valve can also be provided with a thread forming member 35 carried on bar 34 slotted into the nose or forward portion of member 32. The position of member 35 can be shifted by moving bar 34 as indicated by the arrow in FIG. 14b. The position of member 35 can be fixed in this way or it can change or move continuously during the extrusion operation to obtain a wide variety of extruded shapes which can vary in external (Zone A) and internal (Zone C) profile and have internal threads of fixed or varying pitch and/or depth.

The device of FIG. 15a is similar to the arrangement of FIG. 14 wherein needle valve member 32 is provided with grooves 37 converging towards the point thereof. Member 32 in FIG. 15a can reciprocate and/or rotate as in FIG. 14 to provide for a wide variety of internal extruded shapes and surfaces.

Other needle valve arrangements are shown in FIGS. 26 and 27. In FIG. 26 movable plates 31 can be used in place of iris 30 in FIG. 14 to vary the external profile of the extruded article and needle valve member 32 can be profiled to conform the internal profile to the external profile defined by plates 31. In the embodiment shown, plates 31 cooperate to form a diamond shaped profile which can vary in size by moving plates 31 in or out with respect to the center line of extrusion. Obviously, other shapes such as square, oval and the like can be formed by appropriately shaped plates 31. Member 32 in FIG. 26 can also have any desired shape approximating or differing from the external profile formed by plates 31.

In FIG. 27a, plate 33 defines Zone A which is hexagonal in shape in this illustration. Extrusion in zone B is modulated by rotating member 32 which carries thread former 35. The internally threaded article formed is shown in FIG. 27b. The profile 38 with internal threads can be cut along the dotted lines to form individual nuts. The thread 39 can be varied and/or biased as described herein in reference to FIGS. 14, 23 and 25.

The use of a needle valve in the invention as shown and described in FIGS. 14, 15, 24, 26, and 27, for example, has several advantages. The member 32 can have any desired cross-sectional shape and/or external profile and is capable of reciprocating and/or rotating during extrusion to obtain a variety of effects. A tooth, groove or member of another shape can be carried by the neddle valve member and is capable of independent or tandem rotational, oscillatory or other such motion with respect to the valve member itself.

FIG. 15b illustrates an arrangement of annular extrusion zones wherein Zone B is adapted for continuous extrusion and Zone A surrounding continuous zone B defines an annular row of spaced apart elements 24. Iris type device 30 is adapted to periodically interrupt, modulate or restrict the flow of material extruded in Zone A.

In FIG. 20, the extrusion opening is shown to be star-shaped and the continuous extrusion Zone B is within the interior thereof and the tops or ends of the arms of the star define zone A and iris member 30 is used to interrupt or modulate the flow of material in extrusion zone A. It will be evident that a wide variety of unusual shapes can be extruded using the arrangement shown in FIG. 20 simply by programming or controlling the movement of the iris 30 without otherwise changing or modifying the apparatus.

FIG. 22 is similar to FIG. 15b and illustrates a semi-annular continuous extrusion zone B and Zone A which in cross-section defines a plurality of gripping elements. Iris 30 is used to periodically interrupt the flow of material in extrusion zone A to initially form a self-gripping device with an annular base 10 and integral rows of gripping elements 18 extending transverse to the direction of extrusion. The self-gripping device extruded in FIG. 22 can be later treated to flatten the base out to form a planar device if desired.

Referring now to FIGS. 23 and 25, there is illustrated a highly sophisticated application of the present invention. Referring now in particular to FIG. 23a, material is continuously extruded in zone B and is interrupted or modulated in zone A by an iris-type device 30 which also carries a thread forming member 60. Thus, it is possible utilizing the present invention to directly extrude threaded articles which may be round or which may have any other transverse cross-sectional shape desired and which can greatly vary in longitudinal cross-section. By utilizing an iris-type device behind the extrusion opening within the exterior of an extruder, as in FIG. 23a for instance, and by progressively making the extrusion opening smaller using this iris device and by following this movement with the iris device 30 in Zone A, it is possible to also form tapered threaded articles.

FIG. 23b illustrates just one modification of the basic arrangement shown in FIG. 23a wherein two iris devices 30 each having a thread forming member 60 are used in counter-rotating relationship to form articles having both left and right handed threads. One of the iris devices can be actually inside the extrusion device or both of the irises can be outside of the extrusion device and directly adjacent to each other. The right hand and left hand thread forming devices are shown separated in FIGS. 23b for ease of understanding.

FIGS. 25a and b show screw devices having biased means which can be extruded and formed simultaneously according to the invention. The bias means can be on the edge of the thread indicated by the letter $x$, on the face indicated by the letter $y$, or within the trough of the thread indicated by the letter $z$. A thread forming member 60 such as that shown in FIG. 23c can be designed to be fixed in relation to the iris 30 and associated therewith is a movable thread forming member 61 which can be programmed to move in the directions as shown by the arrows to form biased (tilted) teeth on the faces $y$ or in the troughs $z$ of the extruded screw. FIG. 23d shows a modification of the movable thread forming member 61 which includes an overhand portion 62 which upon reciprocation of the member 61 can be used to form biased means on the edge of the thread at x. The devices shown in FIGS. 23c and d can also be incorporated into the devices shown in FIGS. 13, 14, 15, 20, 26 and 27 to make threaded articles with biased threads of all possible configurations, e.g. screw, nuts, etc.

The biased means which can be directly and simultaneously formed with the extruded screw device are shown in greater detail in FIGS. 25c–e. There the thread 70 is shown to have biased teeth 72 formed on the edge of the thread x, said teeth 72 being formed in or on the edges x. On the face y biased teeth 74 are shown and in the trough z biased teeth 76 are shown flat in FIG. 25d and V-shaped FIG. 25c. It should be understood that the biased teeth 74 and 76 can be formed as indentations in the face y or the trough z or they can be formed as raised teeth on the face y or in the trough z.

The screw devices shown in FIGS. 25a and b can have biased means at x, y or z or any combination of these, the means being biased (tilted) in a direction opposite to that of the helical motion of an advancing screw. The biased means are designed to offer relatively little resistance to the advancing motion of the screw but because of their bias unscrewing is greatly resisted and effectively prevented. Eventual cold forming of the material into which the screw has been turned aids in preventing unscrewing.

FIG. 25a indicates that extruded threaded articles can be continuously reinforced with load bearing backbone means of high tensile strength such as any of the materials mentioned herein for reinforcing means 11.

The unique threaded articles with biased threads as shown in the drawing can also be characterized as threaded articles such as screws, bolts, and nuts of all sizes and types having polarized threads such that the forward torque is normally different than the reverse torque. Stated in different terms, the torque required to advance the thread will be usually (preferably) less than the torque reuired to reverse the thread. Thus a normal amount of torque will be required to set a screw or nut with polarized threads but a much greater torque will be required to unscrew a bolt or nut because reverse motion of the thread is resisted and prevented by the polarized threads.

FIG. 25f illustrates that a conventional threaded article such as a screw, bolt, nut, speed nut, etc. can be used as the base in which biased means as shown in FIGS. 25c and d can be formed or to which a layer 77 of softer or harder material can be applied containing polarized (biased) grooves, notches nicks, etc. or polarized particles 75, short fibers and the like. The particles or fibers 75 can be attached or bonded directly to the thread 70 in the x, y and/or z positions in a polarized configuration or they can be applied randomly and become polarized upon the application of forward torque to the threaded article. Such a layer or such particles can be made of metal, plastic, glass, or composites of any of these.

The threaded article embodiment of the invention can be applied to all conventional threaded devices such as screws, bolts, nuts, nuts stamped and bent from thin sheet metal (commonly known as a speed nut) and the like. Specific screws include machine screws, sheet metal screws, selftapering screws, wood screws, lag bolts, carriage bolts, Molly bolts, and the like. Threaded devices with internal polarized threads (nuts) can be used with conventional externally threaded articles or with externally threaded articles also having polarized threads and vice versa. Varying differences in reverse torque will be obtained depending on the internal/external threaded coupling or the material into which an externally threaded device is screwed. For instance, certain materials will become cold more quickly or readily than others thereby engaging the biased means of the polarized threads and building up reverse torque.

The direct extrusion of a further sophisticated and unusual article is shown in FIG. 24 wherein material is cotinuously extruded in annular zone B and periodically interrupted in zone A, which is surrounded by zone B, by means of a reciprocating pin gate device 56. The opening is defined by a tapered extrusion die 54 which enlarges at 55 to accommodate extrusion of a disc-like member 52 in Zone A from tube 51. When the pin gate 56 is moved in the direction opposite to the direction of extrusion and returned to the position shown in FIG. 24, what results is a hollow member 50 which may have any cross-section desired having a series of cells therein divided by disc-like extruded members 52. It is clear that the members 52 can have any thickness and can be randomly or uniformly spaced within the hollow member 50 simply by programming or regulating the movement of the pin gate device 56.

A similar pin gate type arrangement operable axially within an extruder as illustrated in FIG. 24 can be utilized in the linear arrangement shown in FIG. 18 for closing the square-shaped openings in Zone B.

To provide support for an extruded article with respect to its ultimate use or to aid in the initial extrusion operation, supporting members such as filaments, tapes, cables, webs or screens can be incorporated into the continuous extrusion zones provided by the invention. For example, in FIG. 7 a thin, non-woven web represented by dotted line 11 can be fed through extrusion zone B at a rate equal to the speed of extrusion. In FIGS. 21a and 25a, a centrally located filament, yarn or cable 11 can be incorporated into continuous extrusion zone A in a similar manner. FIG. 4 shows a similar arrangement where stands 11 are incorporated into the base of the extruded article. The supporting member 11 can be a monofilament or a plurality of strands such as yarn or rope. Member 11 can also be a strip or width of woven or non-woven fabric made of synthetic or natural fibers, separately or tandem extruded articles such as tubing, rods and other profiles, or wire, knitted mesh and the like. Members 11 support the freshly extruded article and prevent sagging as well as lend reinforcement for the finished (cooled) article such as a support is particularly valuable where plastic foams are extrusion formed by the invention.

The freshly extruded article can also be supported by floating on a liquid of proper density or by a cushion of gas such as air.

FIG. 28 shows suitable extrusion apparatus for use in the invention. Motor M or other conventional drive means turns extruder E which can be of any of the known types, that is, single screw, twin screw, reciprocating screw and the like. Accummulation means N is located between the Extruder E and the extrusion die and compensates for changes in back pressure when plate 26 moves in and out of zone A to interrupt or modulate extrusion while extrusion continues in Zone B. The use of an accumulator preferably equipped with a powered metering piston and valves (as shown) eliminates the need to regulate pressures in the extruder itself and prevents surges or non-uniformities in extrusion.

Pressure in the extruder can be modulated and controlled to produce a varying continuous or discontinuous pressure-time profile including complete arrest of pressure which can be related to the rate of extrusion through the dynamic or changing extrusion opening of the invention. Such pressure changes can be obtained by regulating and changing the extrusion rate by modulating screw speed or rate of feed from the accumulator and the like. Other forces, such as a steady or varying centrifugal force, or fluid pressure, can be exerted on the extruded mass. It will be appreciated that the pressure over face of the extrusion opening may either be uniform or non-uniform. The pressure will be non-uniform particularly if the extrusion opening has areas of non-uniform cross-section or areas which are changing in shape or cross-section as described herein, or if several types of plastic or other extrudate or reinforcement are forced together through the extrusion opening to form a coherent extruded product.

The rate of cooling as an extruded article exits from an extrusion opening may be vary sharp to effectively freeze the extruded shape as it exits from the extrusion opening or cooling can be more gradual to allow for post-treatment to modify the physical or chemical properties of the extruded article or post-forming to modify the shape or surface characteristics of the extruded article such as hardness, stiffness, chemical resistance, and the like.

Techniques for post-treating and post-forming include air cooling, quench cooling, using an inert medium having a matched specific gravity or a higher specific gravity to float an extruded article, annealing and the like or stretching transversely and/or longitudinally. Additional post-treating can also include electric and/or chemical treatments for modifying the physical and/or chemical properties of the extruded structure.

Extruded product made according to the invention can also be used as molding stock for various molding processes such as the continuous molding processes described in copending application Ser. No. 317,034, filed Dec. 20, 1972.

It is also within the purview of the present invention to use secondary operations such as bending, melting down, cold heading, clipping and the like. Further progressive or successive hot and cold post-forming operations include heading, rolling, swaging, bending, jogging, die forming, cutting, slitting, punching perforating, etching, embossing, calendaring, nip-rolling and the like. The base 20 can also be composite laminated, oriented, etc., or reinforced by forming the base with a metal or similar strip sheathed in plastic or the like, or by using other reinforcing members such as wires, mesh, fibers, filaments, fabric or fillers as discussed previously.

The extruded articles of the invention including self-gripping devices can be extruded from any material capable of flow such as putty, plaster or Paris, cement, etc., and melt fabricable materials including metals, metal alloys, plastics, ceramics, glass, and the like. Suitable metals include aluminum and aluminum alloys, magnesium and its alloys, copper, copper alloys, such as berylium copper, iron, carbon and stainless steels and the like. Suitable plastics include thermosetting phenolic compositions, melamines, epoxy resins and the like and thermoplastics such as polyethylene, polypropylene, polystyrenes, polycarbonates, polysulfones, nylons, fluorinated polymers and the like.

Preferably the material to be extruded contains fillers in amount such that extruded articles made according to the invention will retain their shape after extrusion and during cooling and setting or hardening. A useful range for filler materials is from 5 to 80 percent by weight based on the total weight of the material being extruded. Any of the commonly used particulate filler materials can be used. Examples of fillers are clays, chalk, silica, alumina, mica, talc, asbestos, natural, synthetic and glass fivers and wire and the like. Particularly good fillers are those that produce highly non-Newtowan flows in plastics and give materials resembling thick doughs are organo-clays produced by the reaction of fibrous or plate like minerals and clays with selected organic compounds, for example, derived from amines.

The self-gripping devices of the invention are adapted to penetrate and become lodged in a receiving material or layer which can be formed from a wide variety of materials including woven, non-woven, and knitted fabrics and fibers, carpets and carpet-like materials, foamed rubber and plastics, wood, cork, sponge, leather, paper, cardboard, corrugated cardboard, metal and plastic mesh, expanded and perforated sheet materials and composites and laminates including any of the foregoing. Preferred are fibril containing receiving materials. Fibrils include fibers, yarns, filaments and fibrous portions of materials such as the dividing wall in a cellular structure.

Especially suitable receiving materials and structures are disclosed in my copending applications Ser. Nos. 126, 708, and 126, 706, both filed Mar. 22, 1971 and Ser. No. 154,589, filed June 18, 1971.

The cellular article of FIG. 24 can be formed from metals or plastics and is characterized by excellent thermal and electrical insulating properties and also resists compression. The same holds true for the extruded articles from FIG. 18.

I claim:

1. Apparatus for extruding articles which comprises extrusion means having an annular extrusion opening divided into an outer extrusion zone and an inner extrusion zone contiguous with the outer zone, said extrusion means being adapted to melt a melt flowable material and force same through said extrusion opening, said inner zone being adapted to continuously extrude said material and said outer zone having means associated therewith for simultaneously forming a thread in the material being extruded in said outer zone said thread forming means including means for simultaneously forming biased means on one or more of the edge, face or trough of the thread formed in the material being extruded in said outer zone.

2. Apparatus of claim 1 wherein said thread forming means is adapted to form left hand and right hand threads in the material being extruded in the outer zone.

3. Apparatus of claim 1 wherein said thread forming means are constricting and expanding iris means.

* * * * *